(12) United States Patent
Jung et al.

(10) Patent No.: US 11,621,475 B2
(45) Date of Patent: Apr. 4, 2023

(54) METAL ACCESSORY HAVING NON-CONTACT SHORT-RANGE WIRELESS COMMUNICATION FUNCTION, AND MANUFACTURING METHOD THEREFOR

(71) Applicants: Ji Su Jung, Seoul (KR); Yeon Jin Jung, Seoul (KR)

(72) Inventors: Ji Su Jung, Seoul (KR); Yeon Jin Jung, Seoul (KR)

( * ) Notice: Subject to any disclaimer, the term of this patent is extended or adjusted under 35 U.S.C. 154(b) by 191 days.

(21) Appl. No.: 17/258,943

(22) PCT Filed: Aug. 1, 2019

(86) PCT No.: PCT/KR2019/009599
§ 371 (c)(1),
(2) Date: Jan. 8, 2021

(87) PCT Pub. No.: WO2020/036349
PCT Pub. Date: Feb. 20, 2020

(65) Prior Publication Data
US 2021/0344105 A1    Nov. 4, 2021

(30) Foreign Application Priority Data
Aug. 13, 2018    (KR) .......................... 10-2018-0094493

(51) Int. Cl.
*H01Q 1/27* (2006.01)
*H04W 4/80* (2018.01)
(Continued)

(52) U.S. Cl.
CPC ........... *H01Q 1/273* (2013.01); *A44C 9/0053* (2013.01); *A44C 25/001* (2013.01); *H01Q 7/00* (2013.01); *H04W 4/80* (2018.02)

(58) Field of Classification Search
CPC ... A44C 25/001; A44C 27/002; A44C 9/0053; A44C 25/00; H01Q 1/273; H01Q 7/00;
(Continued)

(56) References Cited

U.S. PATENT DOCUMENTS 8,325,015 B2 * 12/2012 Hall ...................... H01Q 1/2225
343/718
11,427,385 B1 * 8/2022 Cutter .................. B65D 25/102
(Continued)

FOREIGN PATENT DOCUMENTS

| KR | 200294180 | 11/2002 |
|----|-----------|---------|
| KR | 201445348 | 6/2008  |
| KR | 101524549 | 6/2015  |

*Primary Examiner* — Thien M Le
(74) *Attorney, Agent, or Firm* — IPLA P.A.

(57) ABSTRACT

A metal accessory having a non-contact communication function, includes: an integrated circuit element (IC chip) for control, capable of performing non-contact short-range wireless communication with an external terminal; a loop antenna with a predetermined length, having both ends connected respectively to both ends of the integrated circuit element for control; and a body part, which is made of a metal or precious metal material, is formed into a loop shape having a through hole formed through the center thereof, and has a slit formed by cutting a partial section of the loop. The integrated circuit element for control and the loop antenna are provided inside the body part, the loop antenna is wound several times along the loop-shaped body part, and a portion of the loop-shaped body part is completely cut by the slit.

8 Claims, 9 Drawing Sheets

(51) Int. Cl.
*A44C 9/00* (2006.01)
*A44C 25/00* (2006.01)
*H01Q 7/00* (2006.01)

(58) Field of Classification Search
CPC ...... H01Q 7/04; H04B 5/0025; H04B 5/0031;
H04B 5/0081; H04W 4/80
See application file for complete search history.

(56) References Cited

U.S. PATENT DOCUMENTS

| | | | |
|---|---|---|---|
| 2014/0240181 A1* | 8/2014 | Mamuro | H01Q 7/00 343/702 |
| 2016/0110639 A1* | 4/2016 | Finn | G06K 19/07756 235/492 |
| 2016/0365644 A1* | 12/2016 | Finn | B23K 26/361 |
| 2017/0017871 A1* | 1/2017 | Finn | G06K 19/07794 |
| 2017/0164151 A1* | 6/2017 | Gavin | G08B 21/0266 |
| 2018/0137741 A1* | 5/2018 | Diallo | H01Q 1/273 |
| 2018/0341846 A1* | 11/2018 | Finn | H04B 5/0062 |

* cited by examiner

METAL ACCESSORY HAVING NON-CONTACT SHORT-RANGE WIRELESS COMMUNICATION FUNCTION, AND MANUFACTURING METHOD THEREFOR

BACKGROUND

The present invention relates to a metal accessory having a non-contact short-range wireless communication function and a manufacturing method therefor, and more particularly, to a metal accessory having a non-contact short-range wireless communication function, which includes an integrated circuit element (IC chip) for control and a loop antenna for non-contact short-range wireless communication mounted in a ring or a pendant of a loop shape made of a metal or precious metal material in order to have a non-contact short-range wireless communication function, and a manufacturing method of the metal accessory.

Recently, credit cards increase in use, and traffic cards or debit cards are frequently and widely used for micropayments. According to using forms of the cards, various methods which make easy to use cards and minimize a risk of loss of the cards have been proposed.

For an example of the methods, ring-shaped cards are proposed.

Korean Utility Model Registration No. 20-0294180 discloses a "ring having an IC chip mounted therein". In Korean Utility Model Registration No. 20-0294180, an IC chip is embedded in an accessory of a ring or a watch so that an IC card can perform lots of functions of credit cards, traffic cards, electronic money, parking cards, department store cards, and so on. The ring having an IC chip mounted therein has a structure that a loop antenna connected to the IC chip providing a non-contact short-range wireless communication function winds a body of the ring. The loop antenna connected to the IC chip performs non-contact short-range wireless communication with an external terminal, and the loop antenna produces induced current by the non-contact short-range wireless communication and provides the IC chip with the induced current and sends and receives data with the external terminal.

However, when the loop antenna is wound on a metal material, the metal material decreases strength of a signal received from the external terminal, so the loop antenna cannot produce induced current and it is difficult to send and receive data with the external terminal.

Therefore, in order to smoothly perform the non-contact short-range wireless communication function of the IC chip, the body of the ring must be made of an electrical insulating material where electricity does not flow. Therefore, the ring according to conventional art cannot be manufactured of a metal material or a precious metal material where electricity flows, but must be manufactured of an electrical insulating material where electricity does not flow, like synthetic resin such as plastic, ceramics, and so on.

Meanwhile, Korean Utility Model Registration No. 20-0445348 discloses a "traffic card". The traffic card includes a traffic card chip, a loop antenna, and a capacitor. Two terminals of the loop antenna and two terminals of the capacitor are connected in parallel with two terminals of the traffic card chip, the loop antenna is wound in a concentric direction three times to five times and is embedded in a loop part, and the traffic card chip and the capacitor are embedded in the body part. However, also in Korean Utility Model Registration No. 20-0445348, it is described that the loop part and the body part must be made of an electrical insulating material, such as synthetic resin, in order to prevent communication disorder between a traffic card and a card terminal. Therefore, the traffic card according to the conventional art can be manufactured in the form of a ring, but has a limit that the body of the ring cannot be manufactured of a metal material or a precious metal material.

SUMMARY OF THE INVENTION

Accordingly, the present invention has been made in an effort to solve the above-mentioned problems occurring in the prior arts, and it is an object of the present invention to provide a metal accessory of a metal material or a precious metal material having a non-contact short-range wireless communication function.

To achieve the above objects, the present invention provides a metal accessory having a non-contact short-range wireless communication function including: an integrated circuit element (IC chip) for control, capable of performing non-contact short-range wireless communication with an external terminal; a loop antenna with a predetermined length, having both ends respectively connected to both ends of the integrated circuit element for control; and a body part, which is made of a metal or precious metal material, is formed into a loop shape having a through hole formed in the middle thereof, and has a slit formed by cutting a partial section of the loop, wherein the integrated circuit element for control and the loop antenna are provided inside the body part, and the loop antenna is wound several times along the loop-shaped body part, and a portion of the loop-shaped body part is completely cut by the slit.

The body part includes: a main body having grooves respectively formed along the inner circumferential surface or the outer circumferential surface so that the integrated circuit element for control and the loop antenna are mounted in the grooves; and a cover for covering the grooves, wherein the slits are respectively formed in the main body and the cover, and the slit of the main body and the slit of the cover are connected with each other.

The body part includes: a first body part formed into a loop shape having a through hole formed in the middle thereof, and having a slit formed by cutting a partial section of the loop; and a second body part having the same shape as the first body part and having one side which gets in contact with one side of the first body part, wherein grooves for mounting the integrated circuit element for control and the loop antenna are formed in the sides of the first body part and the second body part which get in contact with each other, and the slit of the first body part and the slit of the second body part are formed at positions corresponding each other.

The integrated circuit element for control performs non-contact short-range wireless communication with an external terminal through the loop antenna to receive electric power and transmit and receive data.

The integrated circuit element for control is one of an IC chip for credit cards, an IC chip for payment, and an IC chip for door locking devices.

The body part is formed in a ring shape or a pendant shape.

The slit of the body part is charged with an electrical insulating material, or is manufactured of an electrical insulating material or has an oxidation-treated surface to have electrical insulating property.

In another aspect of the present invention, the present invention provides a manufacturing method of a metal accessory having a non-contact short-range wireless communication function including the steps of: (a) manufacturing a body part having a main body and a cover using a metal or precious metal material, wherein the body part is generally formed in a loop shape having a through hole formed in the middle; (b) forming a first groove with a predetermined depth along the inner circumferential surface or the outer circumferential surface of the main body of the body part so that a loop antenna is inserted into the first groove; (c) forming a second groove in a predetermined area of the first groove formed in the inner circumferential surface or the outer circumferential surface so that an integrated circuit element for control is mounted in the second groove; and (d) adhering and connecting both ends of the loop antenna to both ends of the integrated circuit element for control after mounting the integrated circuit element for control in the second groove and mounting the loop antenna wound several times in the first groove.

The manufacturing method further includes the steps of: (a1) manufacturing the main body of the loop shape having the through hole formed in the middle using the metal material or the precious metal material; (a2) manufacturing a cover for covering the first groove and the second groove, which will be formed in the outer circumferential surface or the inner circumferential surface of the main body; and (a3) forming a first slit by completely cutting a partial section of the main body.

The manufacturing method further includes the step of: (a4) forming a second slit by completely cutting a partial section of the cover, wherein the second slit is connected with the first slit; or (a5) manufacturing the cover with an electrical insulating material or oxidation-treating the surface of the cover to have electrical insulating property.

The manufacturing method further includes the step of: (a6) charging the first slit with an electrical insulating material, or (a7) manufacturing a slit charging module using an electrical insulating material or manufacturing a slit charging module using a predetermined material, applying oxidation treatment to the surface of the slit charging module to have electrical insulating property, and inserting the slit charging module into the first slit.

In a further aspect of the present invention, the present inventio provides a manufacturing method of a metal accessory having a non-contact short-range wireless communication function including the steps of: (a) manufacturing a first body part of a loop shape having a through hole formed in the middle using a metal material or a precious metal material; (b) manufacturing a second body part of a loop shape, which is the same as the first body part, and has a through hole formed in the middle, using a metal material or a precious metal material; (c) forming a first groove with a predetermined depth in any one of sides where the first body part and the second body part get in contact with each other so that a loop antenna is inserted into the first groove; (d) forming a second groove in a predetermined area of the first groove, which is formed in any one of sides where the first body part and the second body part get in contact with each other, so that an integrated circuit element for control is mounted in the second groove; (e) respectively mounting the integrated circuit element for control and the loop antenna, which is connected to both ends of the integrated circuit element, in the second groove and the first groove; and (f) adhering one side of the first body part and one side of the second body part to each other so that the side on which the loop antenna is mounted is not exposed to the outside, wherein one side of the first body part and one side of the second body part have the same size and shape and are arranged to get in contact with each other so as to be in an integrated form.

The step (a) includes the steps of: (a1) manufacturing a first body part of the loop shape having the through hole formed in the middle using the metal material or the precious metal material; and (a2) forming a first slit by completely cutting a partial section of the loop of the first body part. The step (b) includes the steps of: (b1) manufacturing a second body part of the loop shape having the through hole formed in the middle using the metal material or the precious metal material; and (b2) forming a second slit by completely cutting a partial section of the loop of the second body part, wherein the first slit and the second slit are formed to be connected with each other.

The manufacturing method further includes the step of: (a6) charging the first slit and the second slit with an electrical insulating material, or (a7) manufacturing a slit charging module using an electrical insulating material or manufacturing a slit charging module using a predetermined material, applying oxidation treatment to the surface of the slit charging module to have electrical insulating property, and inserting the slit charging module into the first slit and the second slit.

The metal accessory according to the present invention is manufactured in the form of a loop-shaped ring or pendant and includes an integrated circuit element and a loop antenna, which facilitate non-contact short-range wireless communication, mounted therein so as to provide non-contact type functions of credit cards, traffic cards, and so on.

Moreover, the metal accessory according to the present invention is manufactured of a metal material or a precious metal material into a loop shape having a through hole in the middle thereof and includes a slit formed by a cut portion of the loop-shaped body, so that the metal accessory has the same outward appearance as the conventional precious metal ring and provide functions of non-contact credit cards or traffic cards.

DETAILED DESCRIPTION OF THE INVENTION

A metal accessory having a non-contact short-range wireless communication function according to the present invention is a ring or a pendant of a loop shape made of a metal material or a precious metal material, and includes an integrated circuit element and a loop antenna mounted in a body so as to facilitate non-contact short-range wireless communication with an external terminal.

Hereinafter, referring to attached drawings, a structure, an operation and of the metal accessory having the non-contact short-range wireless communication function according to the present invention and a manufacturing method of the metal accessory will be described in detail.

First Embodiment

Figure 1:
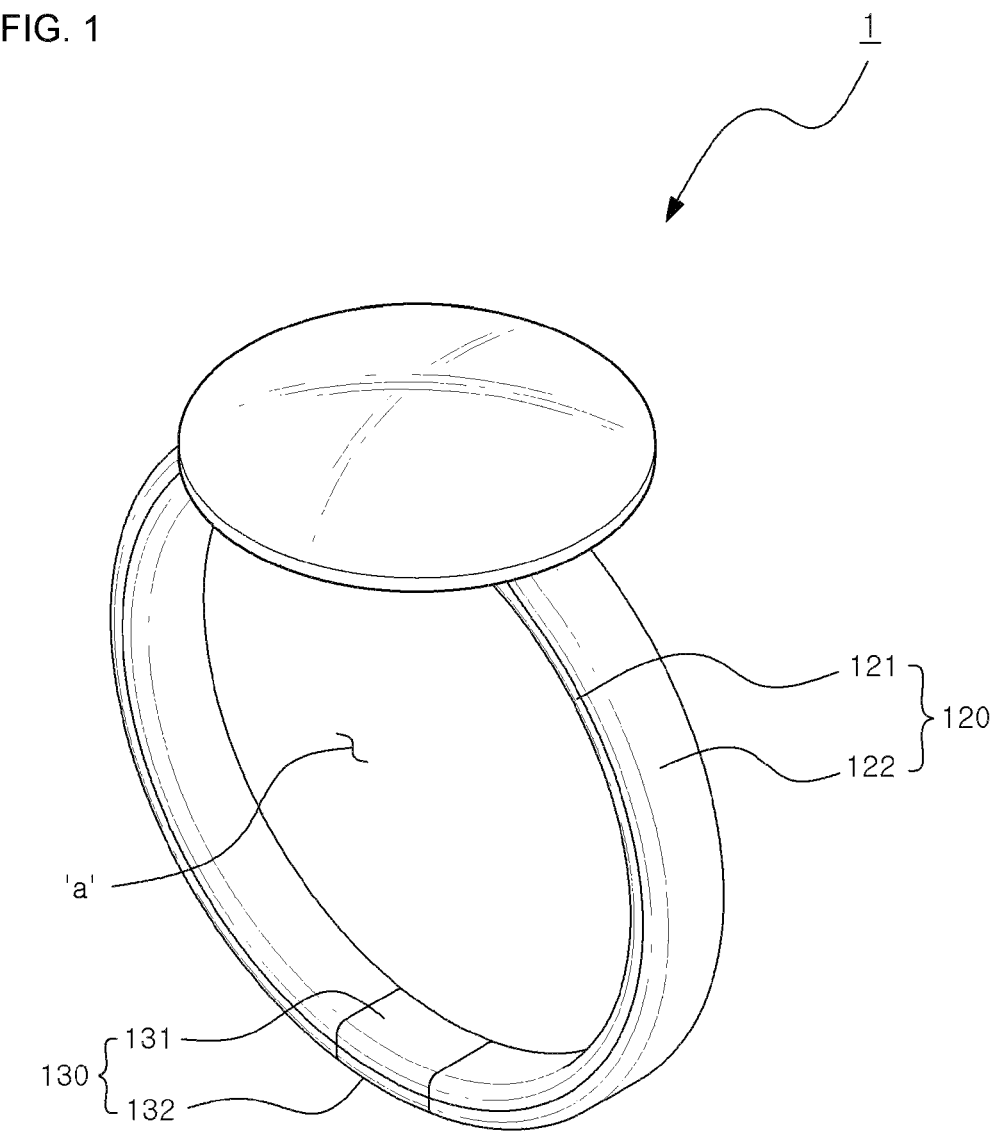
FIG. 1 is a perspective view showing an example of a metal accessory having a non-contact short-range wireless communication function according to a first preferred embodiment of the present invention.
Figure 2:
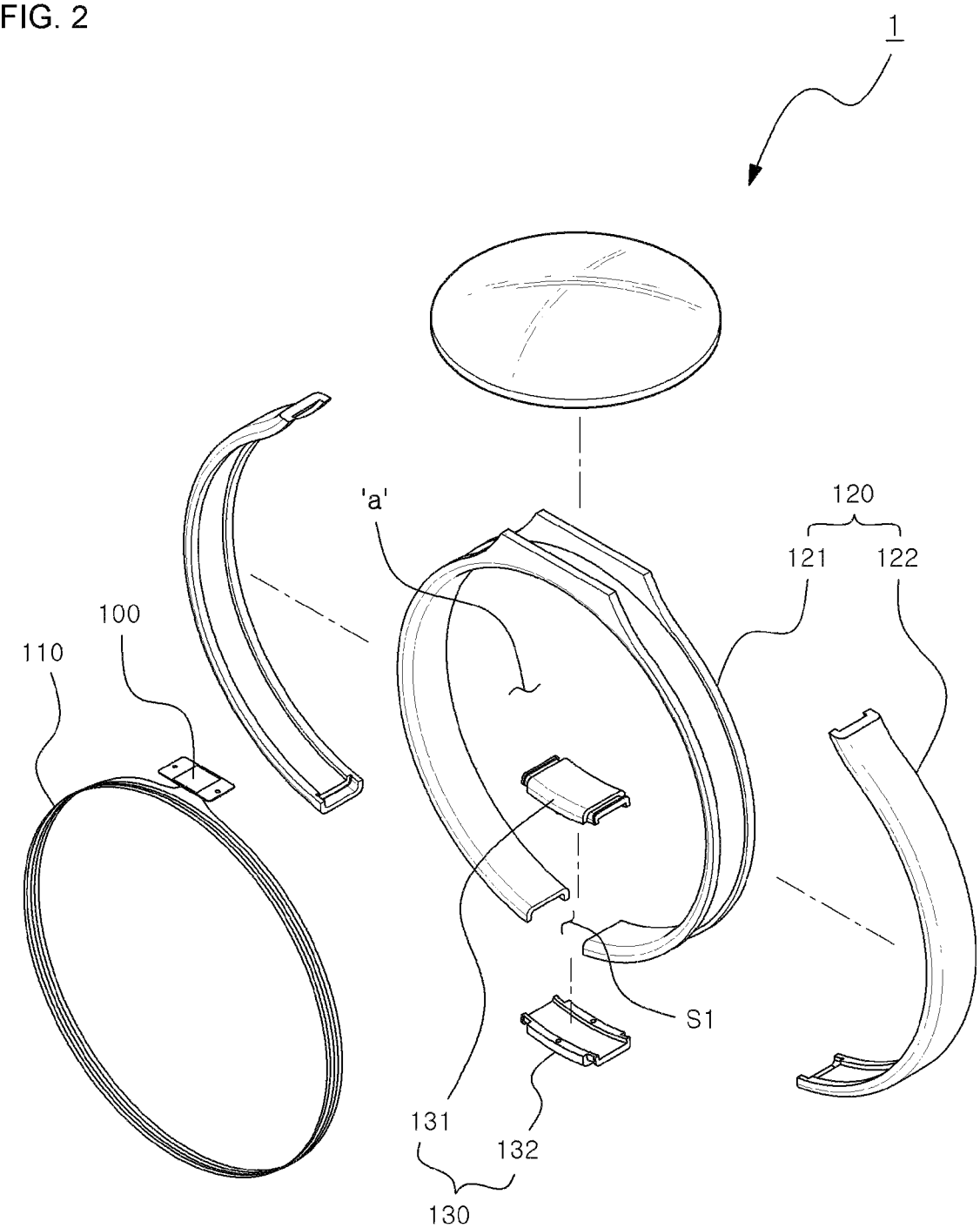
FIG. 2 is an exploded perspective view of the metal accessory according to the first preferred embodiment of FIG. 1.
Figure 3:
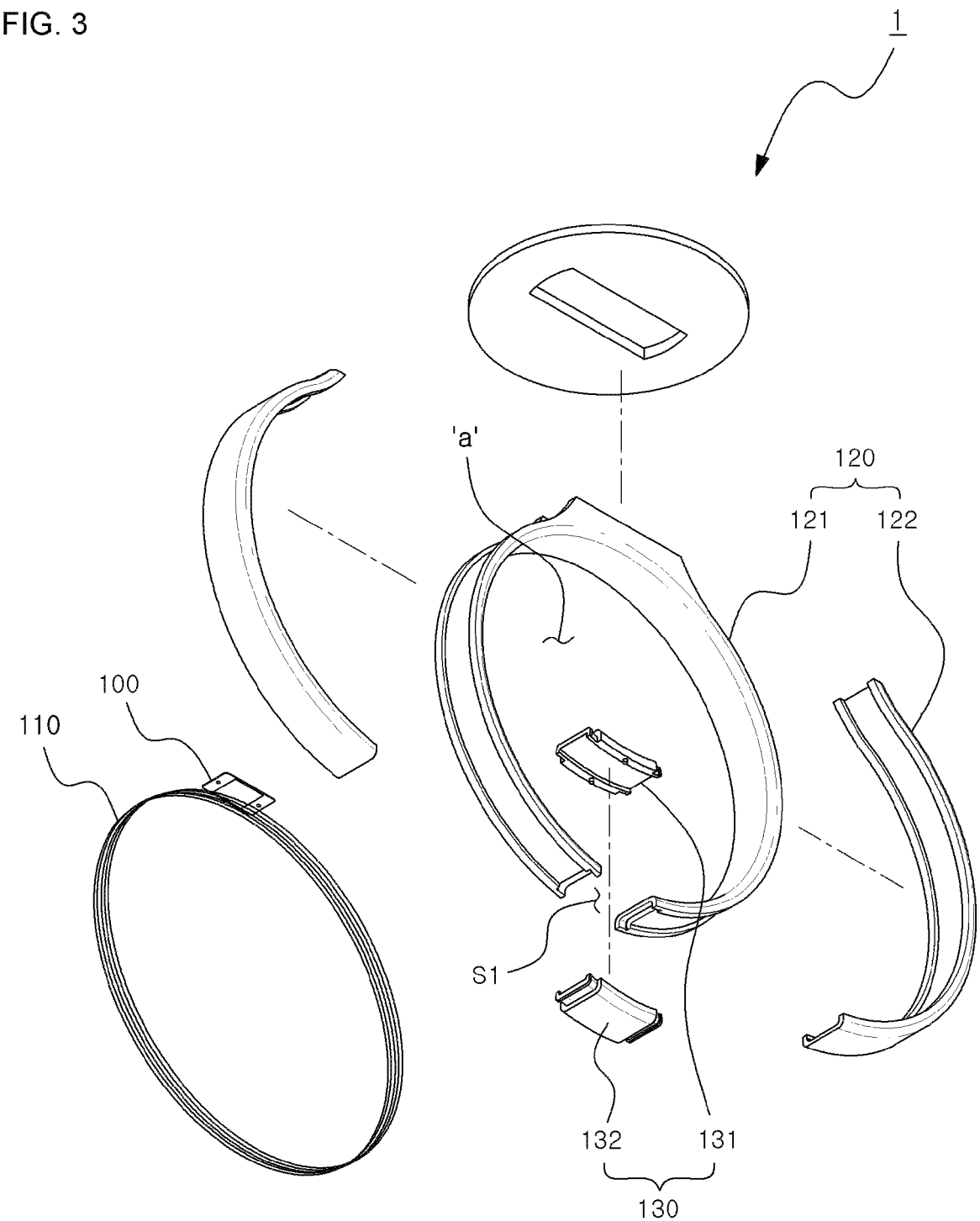
FIG. 3 is an exploded bottom perspective view of the metal accessory according to the first preferred embodiment of FIG. 1.

Referring to FIGS. 1 to 3, a structure and an operation of a metal accessory having a non-contact short-range wireless communication function according to a first preferred embodiment of the present invention will be described in detail.

FIG. 1 is a perspective view showing an example of a metal accessory having a non-contact short-range wireless communication function according to a first preferred embodiment of the present invention. FIG. 2 is an exploded perspective view of the metal accessory according to the first preferred embodiment of FIG. 1, and FIG. 3 is an exploded bottom perspective view of the metal accessory according to the first preferred embodiment of FIG. 1.

Referring to FIG. 1, the non-contact type metal accessory 1 according to the first preferred embodiment is a metal accessory having a ring shape, and includes an integrated circuit element 100 for control, a loop antenna 110, a body part 120, and a slit charging module 130.

The integrated circuit element 100 for control is an integrated circuit element (IC chip) capable of performing non-contact short-range wireless communication with an external terminal, receives electric power and transmits and receives data by performing non-contact short-range wireless communication with the external terminal through the loop antenna, and operates a predetermined program using the transmitted and received data. The integrated circuit element 100 for control may be an IC chip for credit cards, an IC chip for payment, or an IC chip for door locking devices, which is operated in a non-contact manner. If the integrated circuit element 100 for control is the IC chip for cards, the metal accessory according to the present invention can perform the functions of credit cards or traffic cards or the function of payment cards. Moreover, if the integrated circuit element 100 for control is the IC chip for door locking devices, the metal accessory according to the present invention can perform the function as a portable key of the door locking device.

The loop antenna 110 is an antenna with a predetermined length of which both ends are adhered and connected onto both ends of the integrated circuit element 100, and is mounted inside the body part together with the integrated circuit element for control. Preferably, the loop antenna 110 is wound on the body part of the loop shape several times. In order to obtain the signal strength required for smoothly transmitting and receiving data to and from the external terminal, the loop antenna is about 700 mm or more in length.

The body part 120 includes a main body 121 and a cover 122 made of a metal or precious metal material, and generally has a loop shape having a through hole 'a' formed in the middle.

The main body of the body part has a first groove and a second groove formed along the inner circumferential surface or the outer circumferential surface so that the loop antenna and the integrated circuit element for control are respectively mounted on the first groove and the second groove. The loop antenna 110 which is wound several times is mounted on the first groove of the main body 121 of the body part of the loop shape. The integrated circuit element for control is mounted on the second groove of the main body 121, and both ends of the loop antenna are adhered and connected onto the integrated circuit element for control.

The cover 122 is forcedly fit and inserted into the first and second grooves of the main body 121. As shown in FIG. 1, the cover may be divided into several parts or may be manufactured into a single form.

The main body 121 of the body part is made of a metal or precious metal material, for instance, may be one of precious metal materials, such as silver, gold, platinum, and copper, or metal materials with electrical conductivity. Additionally, the main body 120 of the body part must have a first slit S1 formed by completely cutting a partial section of the loop.

In the meantime, the first slit S1 of the main body is charged with an electrical insulating material, for instance, synthetic resin, or a first slit charging module 131 having a shape corresponding to the shape of the first slit is inserted into the first slit so that the first slit is not exposed to the outside and the loop antenna mounted on the body part is not exposed to the outside. The first slit charging module 131 is manufactured of the electrical insulating material or the metal material, and then, surface oxidation treatment is applied to the first slit charging module so that the first slit charging module has electrical insulating property.

The cover 122 may be manufactured of an electrical insulating material or manufactured of the same material as the main body. If the cover is manufactured of the same material as the main body, such as metal or precious metal, the cover must have a second slit formed by completely cutting a partial section of the loop, and the second slit must be connected with the first slit of the main body.

Meanwhile, the second slit of the cover is charged with the electrical insulating material, for instance, synthetic resin, or a second slit charging module 132 having a shape corresponding to the shape of the second slit is inserted into the second slit so that the second slit is not exposed to the outside and the loop antenna mounted on the body part is not exposed to the outside. The second slit charging module 132 is manufactured of the electrical insulating material or the metal material, and then, surface oxidation treatment is applied to the second slit charging module so that the second slit charging module has electrical insulating property.

That is, the slit charging module 130 includes the first slit charging module 131 and the second slit charging module 132, and the slit of the body part by the slit charging module is charged with electrical insulating materials.

As described above, the first slit and the second slit are respectively formed in the main body and the cover of the body part made of the metal material or the precious metal material, so that the loop antenna produces induced current by the external terminal to operate the integrated circuit element for control and the integrated circuit element for control transmits and receives data to and from the external terminal through the loop antenna.

The first slit and the second slit may have a single straight form or may have one or more curved portions. If the first slit and the second slit have the curved portions, it may enhance stiffness of the body part.

As shown in FIG. 1, because the body part has a ring shape, the metal accessory according to the present invention may be used as a ring-shaped card or a key for a ring-shaped door locking device.

Hereinafter, referring to the attached drawings, a manufacturing method of the metal accessory according to the first preferred embodiment of the present invention will be described in detail.

Figure 4:
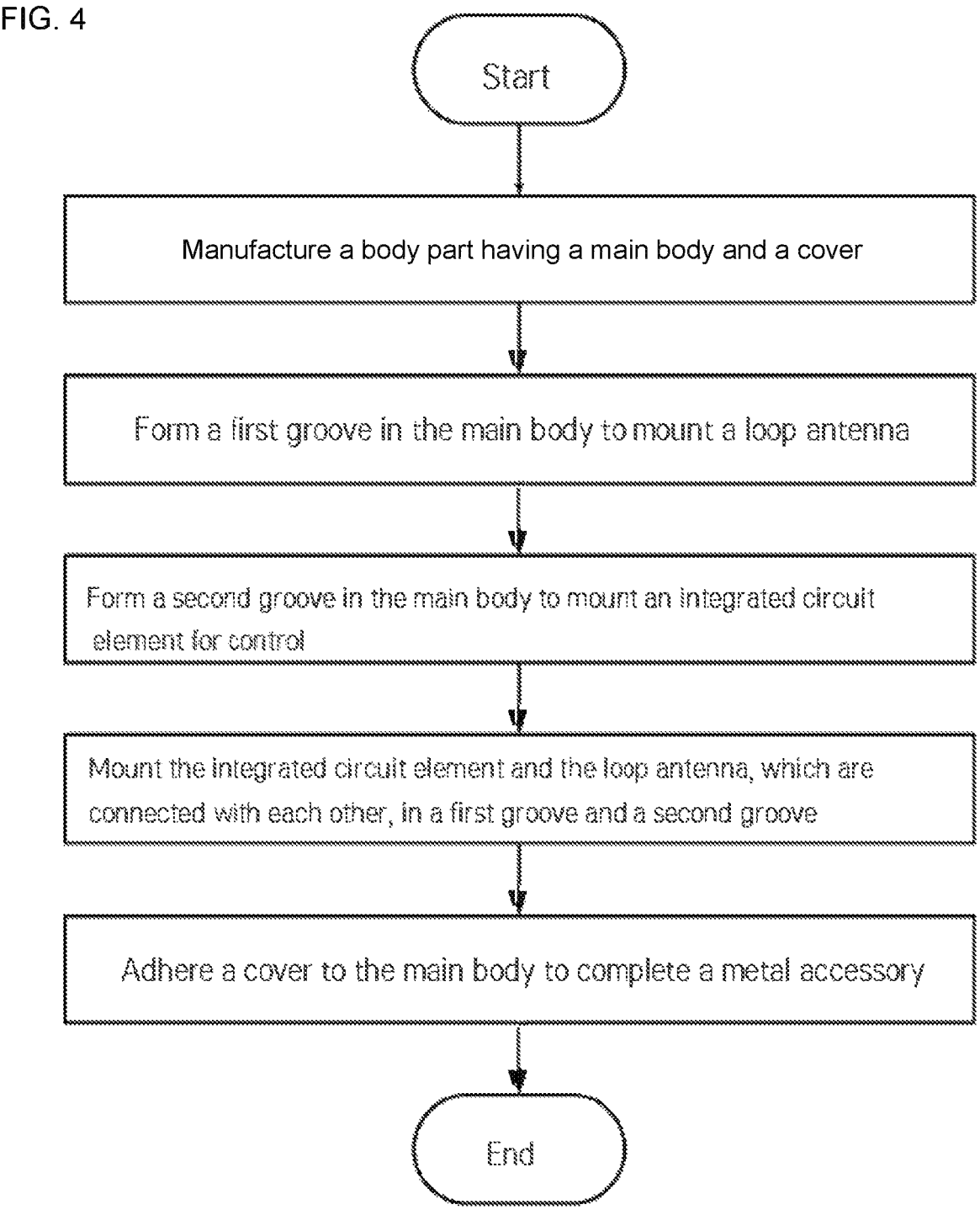
FIG. 4 is a flow chart showing a manufacturing method of the metal accessory according to the first preferred embodiment of the present invention.

FIG. 4 is a flow chart showing a manufacturing method of the metal accessory according to the first preferred embodiment of the present invention.

Referring to FIG. 4, the manufacturing method of the metal accessory according to the first preferred embodiment of the present invention includes the steps of: (a) manufacturing a body part having a main body and a cover using a metal or precious metal material, wherein the body part is generally formed in a loop shape having a through hole formed in the middle; (b) forming a first groove with a predetermined depth along the inner circumferential surface or the outer circumferential surface of the main body of the body part so that a loop antenna is inserted into the first groove; (c) forming a second groove in a predetermined area of the first groove formed in the inner circumferential surface or the outer circumferential surface so that an integrated circuit element for control is mounted in the second groove; and (d) adhering and connecting both ends of the loop antenna to both ends of the integrated circuit element for control after mounting the integrated circuit element for control in the second groove and mounting the loop antenna wound several times in the first groove.

The step (a) includes the steps of: (a1) manufacturing the main body of the loop shape having the through hole formed in the middle using the metal material or the precious metal material; (a2) manufacturing a cover for covering the first groove and the second groove, which will be formed in the outer circumferential surface or the inner circumferential surface of the main body; and (a3) forming a first slit by completely cutting a partial section of the main body.

In the meantime, according to the manufacturing method, the cover is manufactured of the same metal material or the same precious metal material as the main body or manufactured of an electrical insulating material. If the cover is manufactured of the same metal material or the same precious metal material as the main body, preferably, the manufacturing method further includes the step of forming a second slit by completely cutting a partial section of the cover in such a way that the second slit is connected with the first slit, or the step of applying oxidation treatment to the surface of the cover to have electrical insulating property. Meanwhile, when the second slit is formed in the cover, the second slit is preferably connected with the first slit of the main body.

The manufacturing method further includes the step of charging the first slit and the second slit with an electrical insulating material or the step of forcedly fitting and inserting slit charging modules into the first and second slits. The slit charging modules are manufactured of an electrical insulating material or of a predetermined material and oxidation treatment is applied to the surfaces of the slit charging modules so as to have electrical insulating property.

Second Embodiment

Hereinafter, referring to the attached drawings, a structure and an operation of a metal accessory according to a second preferred embodiment of the present invention will be described in detail.

Figure 5:
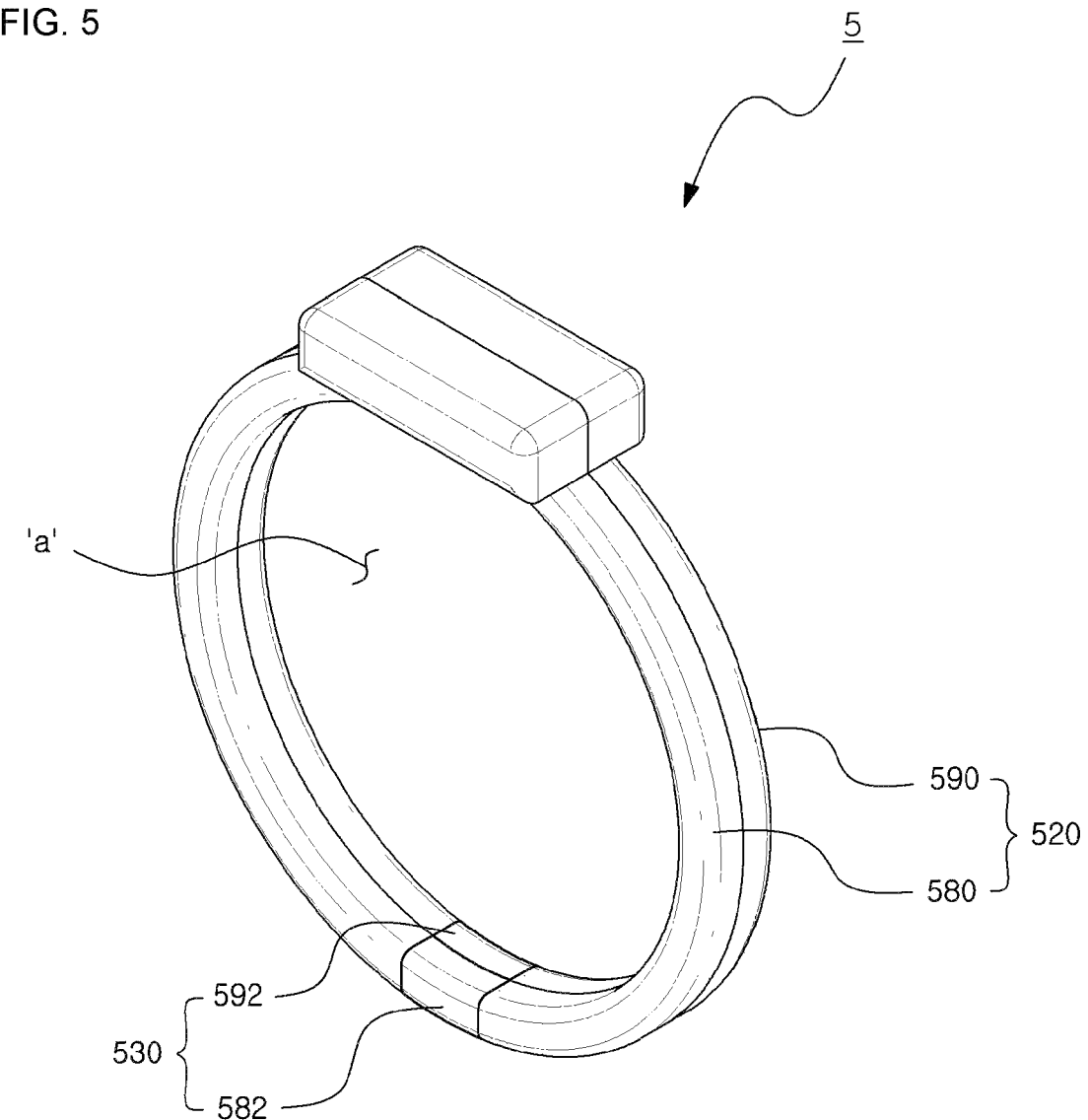
FIG. 5 is a perspective view showing an example of a metal accessory having a non-contact short-range wireless communication function according to a second preferred embodiment of the present invention.
Figure 6:
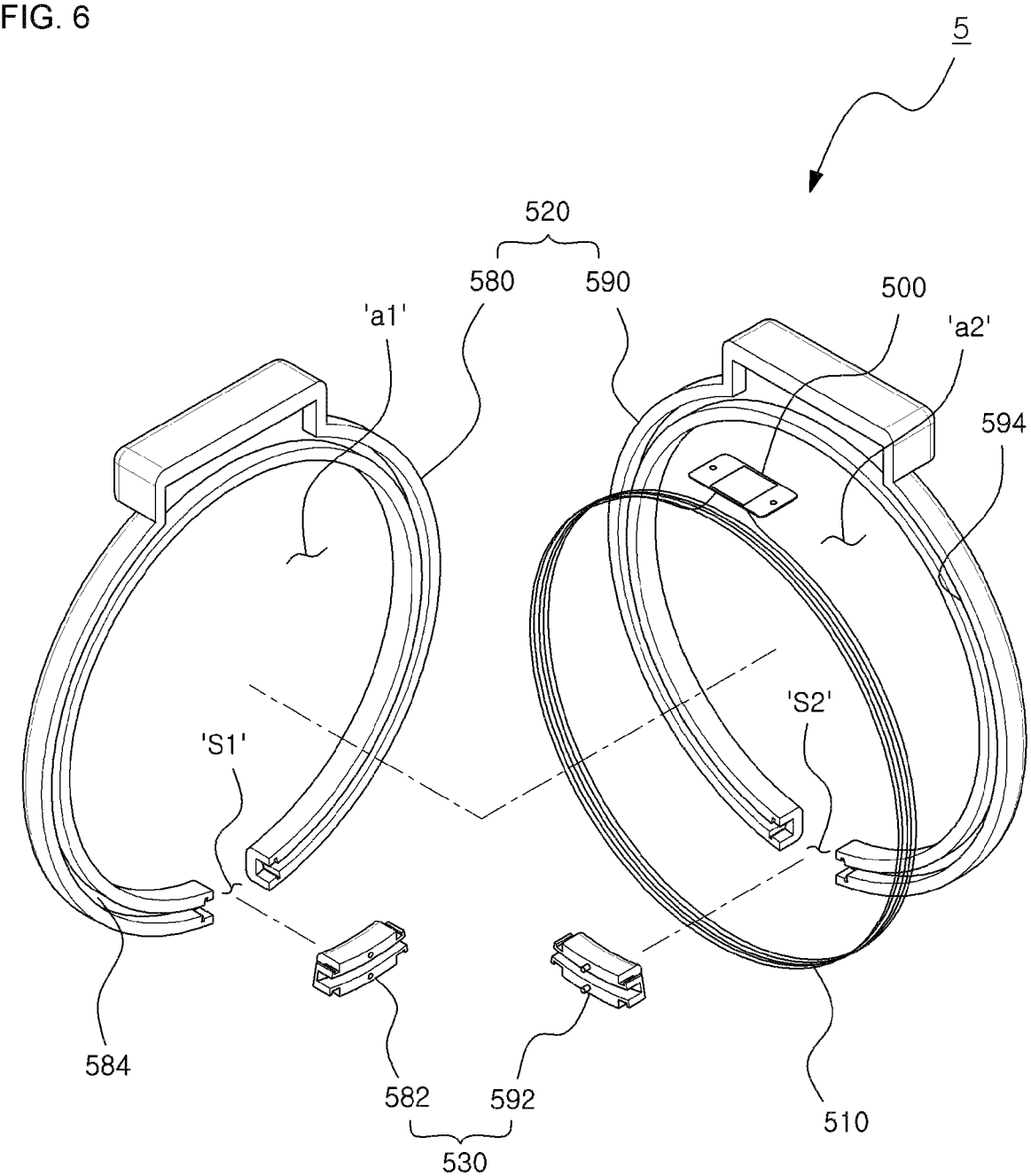
FIG. 6 is an exploded perspective view of the metal accessory according to the second preferred embodiment of the present invention.

FIG. 5 is a perspective view showing an example of a metal accessory having a non-contact short-range wireless communication function according to a second preferred embodiment of the present invention, and FIG. 6 is an exploded perspective view of the metal accessory of FIG. 5.

Referring to FIGS. 5 and 6, the non-contact type metal accessory 5 according to the second preferred embodiment is a metal accessory having a ring shape, and includes an integrated circuit element 500 for control, a loop antenna 510, a body part 520, and a slit charging module 530.

Because the integrated circuit element 500 for control and the loop antenna 510 are the same as the first preferred embodiment, repeated descriptions of the integrated circuit element 500 for control and the loop antenna 510 will be omitted.

The body part 520 includes a first body part 580 and a second body part 590 made of a metal or precious metal material, and generally has a loop shape having a through hole 'a' formed in the middle. The first body part and the second body part respectively have a first through hole a1 and a second through hole a2, generally have the same shape, and are arranged in such a way that one side of the first body part and one side of the second body part get in contact with each other.

One or both of the sides of the first and second body parts getting in contact with each other have grooves 584 and 594 for mounting the integrated circuit element for control and the loop antenna therein. The loop antenna 510 which is wound several times is mounted in the first groove formed in any one of the first and second body parts of the loop shape. The integrated circuit element for control is mounted in the second groove formed in the other one of the first and second body parts, and both ends of the loop antenna are adhered and connected onto the integrated circuit element for control.

Meanwhile, the integrated circuit element for control and the loop antenna may be an all-in-one antenna module formed by being molded to be mounted in the first and second grooves, or may be formed by an antenna module mounted in the first and second grooves.

The first body part 580 and the second body part 590 of the body part may be made of a metal or precious metal material, for instance, may be one of precious metal materials, such as silver, gold, platinum, and copper, or metal materials with electrical conductivity. Additionally, the first body part 580 and the second body part 590 of the body part must have a first slit S1 and a second slit S2 formed by completely cutting a partial section of the loop. Preferably, the first slit and the second slit are disposed to be connected with each other.

Meanwhile, the first slit S1 and the second slit S2 are charged with an electrical insulating material, for instance, synthetic resin, or a first slit charging module 582 and a second slit charging module 592, which have the shape corresponding to the shape of the first slit and the second slit are inserted into the first slit and the second slit so that the first slit and the second slit are not exposed to the outside and the loop antenna mounted on the body part is not exposed to the outside. The first slit charging module and the second slit charging module are manufactured of the electrical insulating material or the metal material, and then, surface oxidation treatment is applied to the first slit charging module and the second slit charging module so that the surfaces of the first slit charging module and the second slit charging module have electrical insulating property.

As described above, the first slit and the second slit of the body part made of the metal material or the precious metal material respectively have the first slit and the second slit, so that the loop antenna produces induced current by the external terminal to operate the integrated circuit element for control and the integrated circuit element for control transmits and receives data to and from the external terminal through the loop antenna.

The first slit and the second slit may have a single straight form or may have one or more curved portions. If the first slit and the second slit have the curved portions, it may enhance stiffness of the body part.

As shown in FIG. 5, because the body part has a ring shape, the metal accessory according to the present invention may be used as a ring-shaped card or a key for a ring-shaped door locking device.

Hereinafter, referring to the attached drawings, a manufacturing method of the metal accessory according to the second preferred embodiment of the present invention will be described in detail.

Figure 9:
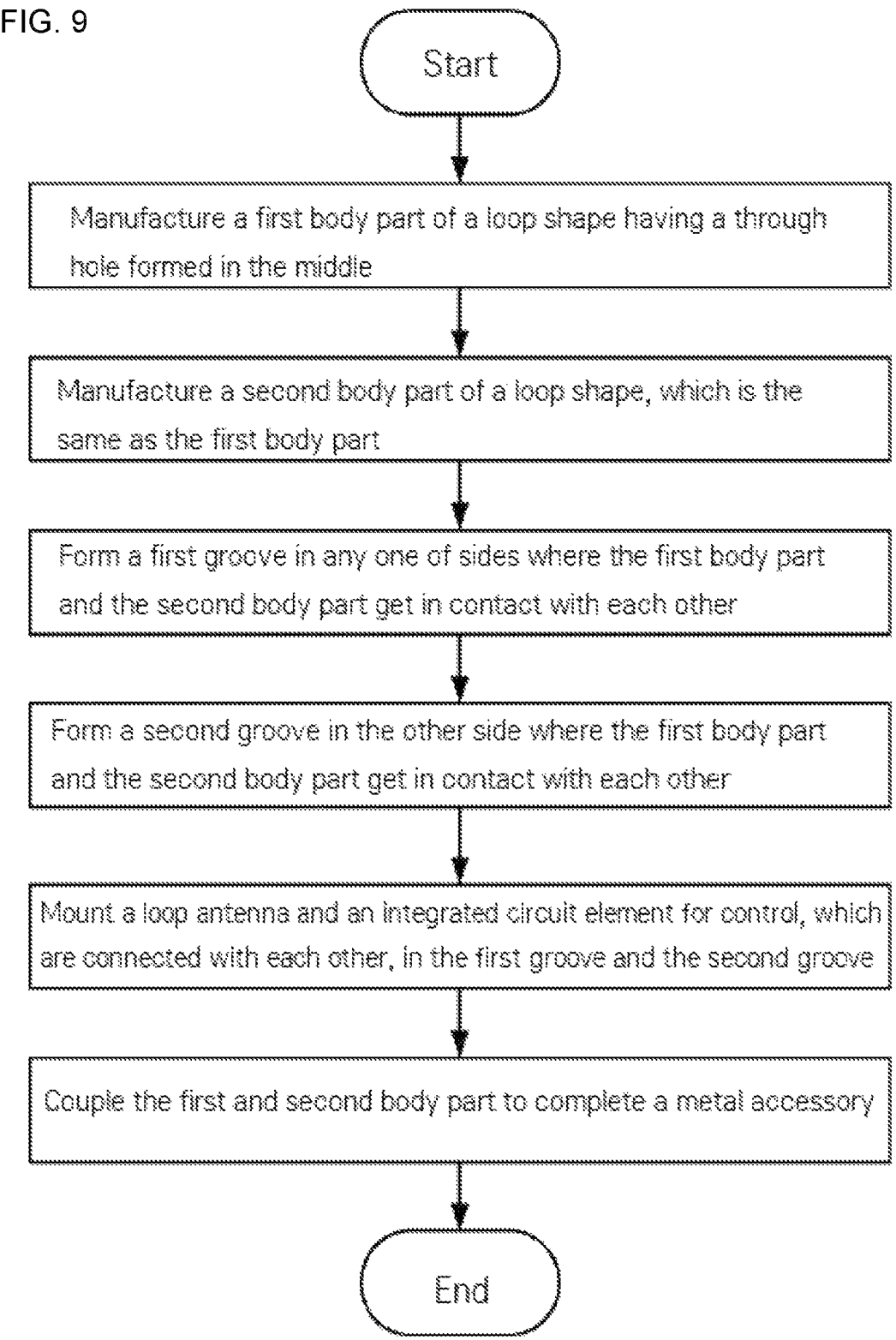
FIG. 9 is a flow chart showing a manufacturing method of the metal accessory according to the second preferred embodiment of the present invention.

FIG. 9 is a flow chart showing a manufacturing method of the metal accessory according to the second preferred embodiment of the present invention.

Referring to FIG. 9, the manufacturing method of the metal accessory according to the second preferred embodiment of the present invention includes the steps of: (a) manufacturing a first body part of a loop shape having a through hole formed in the middle using a metal material or a precious metal material; (b) manufacturing a second body part of a loop shape, which is the same as the first body part, and has a through hole formed in the middle, using a metal material or a precious metal material; (c) forming a first groove with a predetermined depth in any one of sides where the first body part and the second body part get in contact with each other so that a loop antenna is inserted into the first groove; (d) forming a second groove in a predetermined area of the first groove, which is formed in any one of sides where the first body part and the second body part get in contact with each other, so that an integrated circuit element for control is mounted in the second groove; (e) respectively mounting the integrated circuit element for control and the loop antenna, which is connected to both ends of the integrated circuit element, in the second groove and the first groove; and (f) adhering one side of the first body part and one side of the second body part to each other so that the side on which the loop antenna is mounted is not exposed to the outside.

One side of the first body part and one side of the second body part have the same size and shape and are arranged to get in contact with each other so as to be in an integrated form.

The step (a) includes the steps of: (a1) manufacturing a first body part of the loop shape having the through hole formed in the middle using the metal material or the precious metal material; and (a2) forming a first slit by completely cutting a partial section of the loop of the first body part. The step (b) includes the steps of: (b1) manufacturing a second body part of the loop shape having the through hole formed in the middle using the metal material or the precious metal material; and (b2) forming a second slit by completely cutting a partial section of the loop of the second body part, wherein the first slit and the second slit are formed to be connected with each other.

The manufacturing method further includes the step of: (a6) charging the first slit and the second slit with an electrical insulating material, or (a7) manufacturing a slit charging module using an electrical insulating material or manufacturing a slit charging module using a predetermined material, applying oxidation treatment to the surface of the slit charging module to have electrical insulating property, and inserting the slit charging module into the first slit and the second slit.

Third Embodiment

Hereinafter, referring to the attached drawings, a structure and an operation of a metal accessory according to a third preferred embodiment of the present invention will be described in detail. The metal accessory according to the third preferred embodiment of the present invention is formed in a pendant shape, and may be used as a payment card or a key for a door locking device by being connected to a necklace or a cellphone hanger.

Figure 7:
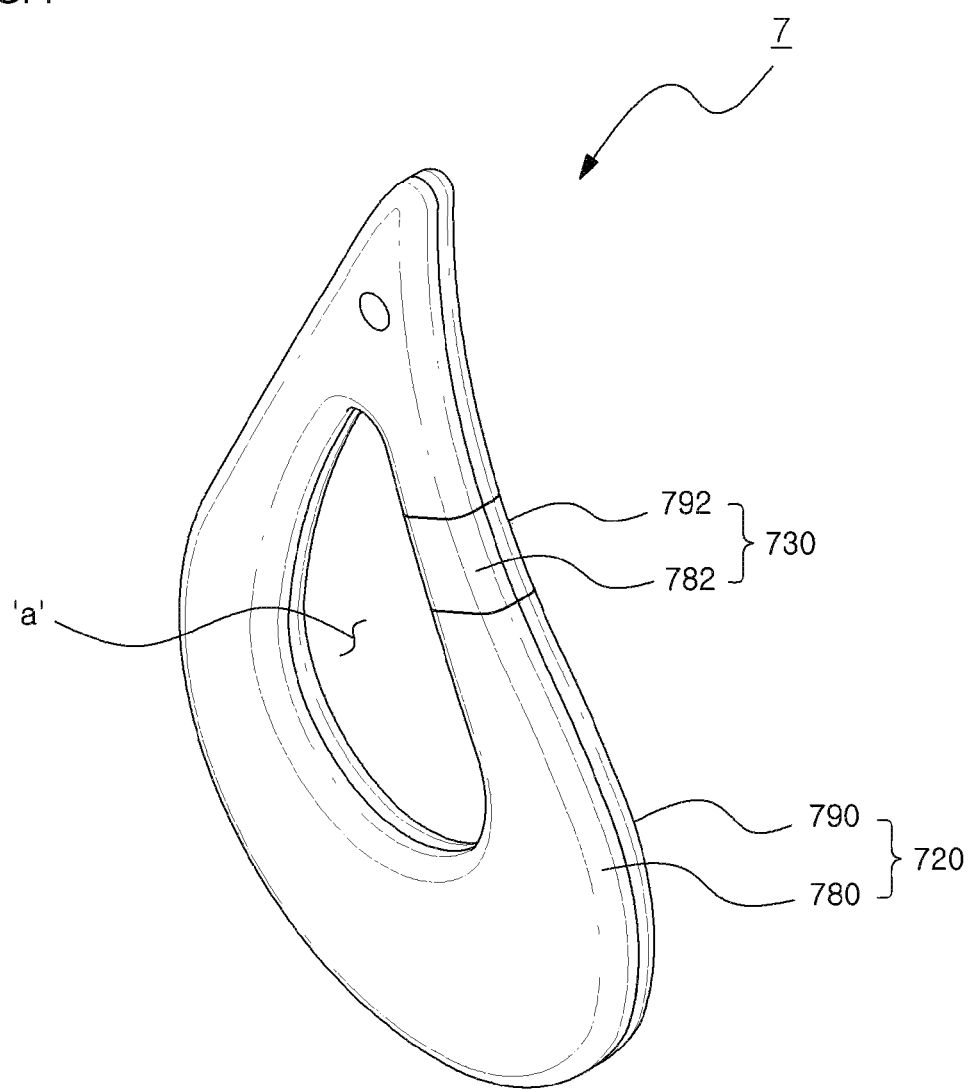
FIG. 7 is a perspective view showing another example of the metal accessory having a non-contact short-range wireless communication function according to the second preferred embodiment of the present invention.
Figure 8:
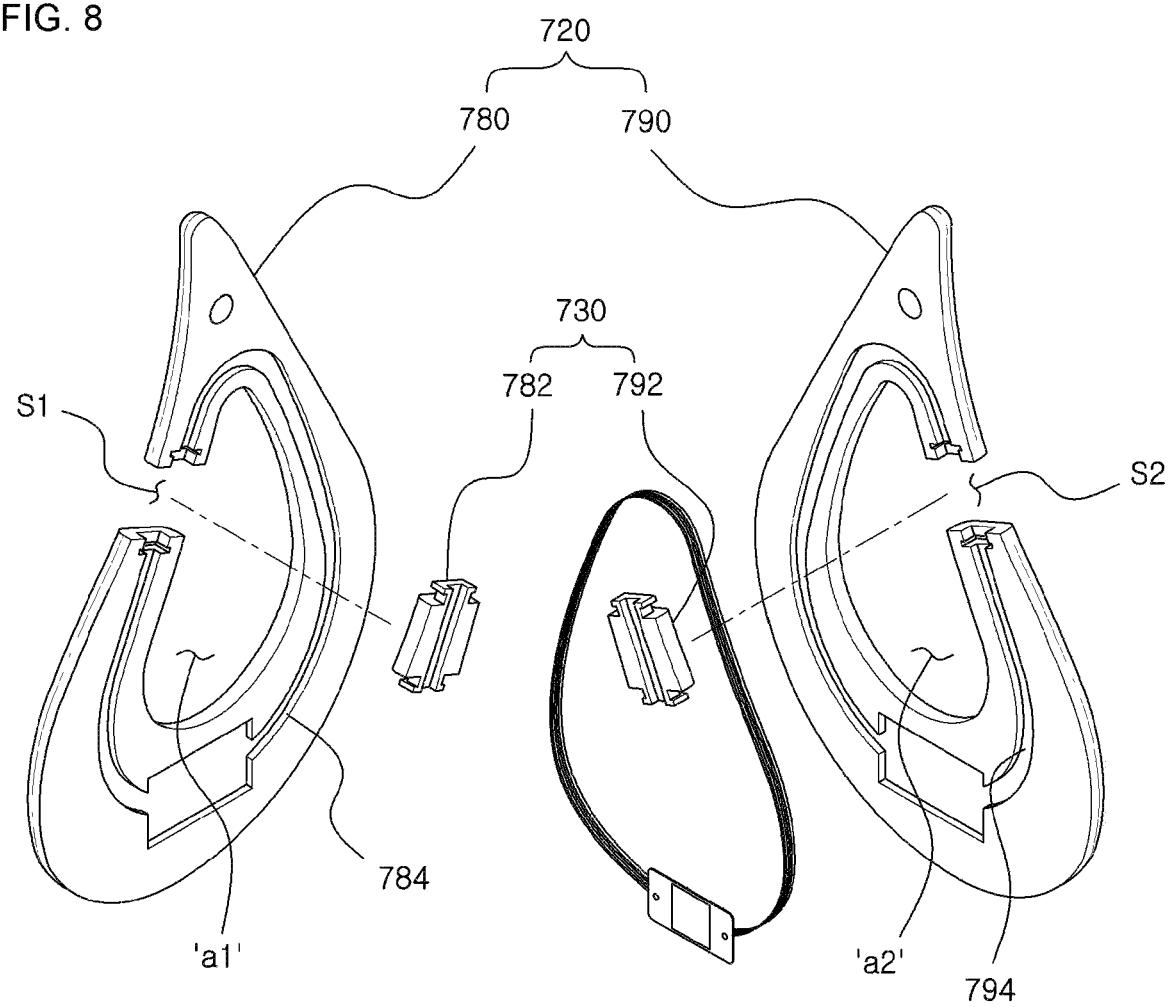
FIG. 8 is an exploded perspective view of the metal accessory of FIG. 7.

FIG. 7 is a perspective view showing another example of the metal accessory having a non-contact short-range wireless communication function according to the second preferred embodiment of the present invention. FIG. 8 is an exploded perspective view of the metal accessory of FIG. 7.

Referring to FIGS. 7 and 8, the non-contact type metal accessory 7 according to the third preferred embodiment is a metal accessory like a pendant, and includes an integrated circuit element 800 for control, a loop antenna 710, a body part 720, and a slit charging module 730.

Because the integrated circuit element 700 for control and the loop antenna 710 are the same as the second preferred embodiment, repeated descriptions of the integrated circuit element 700 for control and the loop antenna 710 will be omitted.

The body part 720 includes a first body part 780 and a second body part 790 made of a metal or precious metal material, and the integrated circuit element 700 for control and the loop antenna 710 wound several times and connected to both ends of the integrated circuit element are mounted on the body part 720. Preferably, a hole 'a' of a predetermined diameter is formed in an inner area of the loop antenna, and slits S1 and S2 are formed in the body part to be connected with the hole. Slit charging modules 782 and 792 are forcedly fit and inserted into the slits S1 and S2.

The first body part and the second body part respectively include a first hole a1 and a second hole a2, generally have the same shape, and are arranged in such a way that one side of the first body part and one side of the second body part get in contact with each other.

One or both of the sides of the first and second body parts getting in contact with each other have grooves 784 and 794 for mounting the integrated circuit element for control and the loop antenna therein. The loop antenna 710 which is wound several times is mounted in a first groove formed in any one of the first and second body parts of the loop shape. The integrated circuit element for control is mounted in a second groove formed in the other one of the first and second body parts, and both ends of the loop antenna are adhered and connected onto the integrated circuit element for control.

In the first to third preferred embodiments, the metal accessory according to the present invention has the through hole or the hole formed in the inner area of the body part where the loop antenna is mounted in order to provide a space through which a magnetic field passes. Moreover, the metal accessory according to the present invention has the slit formed in some area of the body part where the loop antenna is mounted in order to provide resonant effect. Therefore, the loop antenna and the integrated circuit element of the metal accessory according to the present invention can perform non-contact short-range wireless communication with an external terminal or a reader. while the present invention has been particularly described with reference to exemplary embodiments, the present invention is not limited thereto. It will be understood by those skilled in the art that various modifications and applications, which are not illustrated in the above, may be made without departing from the spirit and scope of the present invention. For example, each component illustrated in the embodiments may be modified and made. It should be interpreted that differences related to these modifications and applications are included in the scope of the invention defined in the appended claims.

The invention claimed is:

1. A metal accessory having a non-contact short- range wireless communication function comprising:
   an integrated circuit element (IC chip) for control, capable of performing non-contact short-range wireless communication with an external terminal;
   a loop antenna with a predetermined length, having both ends respectively connected to both ends of the integrated circuit element for control; and
   a body part, which is made of a metal or precious metal material, is formed into a loop shape having a through hole formed in the middle thereof, and has a slit formed by cutting a partial section of the loop,
   wherein the integrated circuit element for control and the loop antenna are provided inside the body part, and the loop antenna is wound several times along the loop-shaped body part,
   wherein a portion of the loop-shaped body part is completely cut by the slit, and
   wherein the slit of the body part is charged with an electrical insulating material, or is manufactured of an electrical insulating material or has an oxidation-treated surface to have electrical insulating property.

2. The metal accessory according to claim 1, wherein the body part includes:
   a main body having grooves respectively formed along the inner circumferential surface or the outer circumferential surface so that the integrated circuit element for control and the loop antenna are mounted in the grooves; and
   a cover for covering the grooves,
   wherein the slits are respectively formed in the main body and the cover, and the slit of the main body and the slit of the cover are connected with each other.

3. The metal accessory according to claim 1, wherein the body part includes:
   a first body part formed into a loop shape having a through hole formed in the middle thereof, and having a slit formed by cutting a partial section of the loop; and
   a second body part having the same shape as the first body part and having one side which gets in contact with one side of the first body part, wherein grooves for mounting the integrated circuit element for control and the loop antenna are formed in the sides of the first body part and the second body part which get in contact with each other, and
   wherein the slit of the first body part and the slit of the second body part are formed at positions corresponding each other.

4. The metal accessory according to claim 1, wherein the integrated circuit element for control performs non-contact short-range wireless communication with an external terminal through the loop antenna to receive electric power and transmit and receive data.

5. The metal accessory according to claim 4, wherein the integrated circuit element for control is one of an IC chip for credit cards, an IC chip for payment, and an IC chip for door locking devices.

6. The metal accessory according to claim 1, wherein the body part is formed in a ring shape or a pendant shape.

7. A manufacturing method of a metal accessory having a non-contact short-range wireless communication function comprising the steps of:
   (a) manufacturing a body part having a main body and a cover using a metal or precious metal material, wherein the body part is generally formed in a loop shape having a through hole formed in the middle;
   (b) forming a first groove with a predetermined depth along the inner circumferential surface or the outer circumferential surface of the main body of the body part so that a loop antenna is inserted into the first groove;
   (c) forming a second groove in a predetermined area of the first groove formed in the inner circumferential surface or the outer circumferential surface so that an integrated circuit element for control is mounted in the second groove;
   (d) adhering and connecting both ends of the loop antenna to both ends of the integrated circuit element for control after mounting the integrated circuit element for control in the second groove and mounting the loop antenna wound several times in the first groove;
   (a1) manufacturing the main body of the loop shape having the through hole formed in the middle using the metal material or the precious metal material;
   (a2) manufacturing a cover for covering the first groove and the second groove, which will be formed in the outer circumferential surface or the inner circumferential surface of the main body;
   (a3) forming a first slit by completely cutting a partial section of the main body, and
   (a4) forming a second slit by completely cutting a partial section of the cover, wherein the second slit is connected with the first slit; or
   (a5) manufacturing the cover with an electrical insulating material or oxidation-treating the surface of the cover to have electrical insulating property.

8. The manufacturing method according to claim 7, further comprising the step of:
   (a6) charging the first slit with an electrical insulating material, or
   (a7) manufacturing a slit charging module using an electrical insulating material or manufacturing a slit charging module using a predetermined material, applying oxidation treatment to the surface of the slit charging module to have electrical insulating property, and inserting the slit charging module into the first slit.

* * * * *